United States Patent [19]

Rainer

[11] Patent Number: 4,805,642

[45] Date of Patent: Feb. 21, 1989

[54] PROCESS FOR REMOVING INORGANIC NITRATE FROM AGRICULTURAL PRODUCTS

[76] Inventor: Norman B. Rainer, 2008 Fondulac Rd., Richmond, Va. 23229

[21] Appl. No.: 94,151

[22] Filed: Sep. 8, 1987

[51] Int. Cl.$^4$ .................... A24B 15/24; A24B 15/28; A23K 1/00
[52] U.S. Cl. .................... 131/297; 131/309; 426/318
[58] Field of Search ................. 131/297, 309; 426/318

[56] References Cited

U.S. PATENT DOCUMENTS

| | | | |
|---|---|---|---|
| 440,528 | 11/1890 | Bachelerie | 426/318 |
| 3,911,147 | 10/1975 | Barham | 426/318 |

FOREIGN PATENT DOCUMENTS

| | | | |
|---|---|---|---|
| 0034997 | 3/1978 | Japan | 131/297 |
| 0012030 | 8/1893 | United Kingdom | 426/318 |
| 0191473 | 1/1923 | United Kingdom | 426/318 |

Primary Examiner—Vincent Millin

[57] ABSTRACT

A process is provided for the dry treatment of agricultural products such as corn, leafy plant material, animal feed, silage material and tobacco to remove fertilizer-derived nitrate. The process involves a short duration contact of the agricultural product with HCl gas under conditions which minimize generation of non-volatile chlorocarbons that could form by interaction of the agricultural product with the gaseous products of the reaction of the HCl with the nitrate. The gaseous products are swept quickly away from the treated agricultural product by a carrier gas such as nitrogen, carbon dioxide, air, helium, and HCl.

13 Claims, No Drawings

PROCESS FOR REMOVING INORGANIC NITRATE FROM AGRICULTURAL PRODUCTS

BACKGROUND OF THE INVENTION

This invention relates to the treatment of leafy agricultural products, and more particularly concerns the treatment of tobacco and silage corn to minimize the content of nitrate originating from fertilizers.

Corn which is intended as cattle feed is generally comminuted and stored in silos until ready for use. Such silage material may owever contain large amounts of nitrate, particularly when the corn crop had been fertilized with nitrate-containing fertilizer and then experienced dry growth conditions. The high nitrate content of the silage may be fatal to cattle.

Tobacco leaf and stem materials generally contain quantities of potassium nitrate ranging between 2% and 10% by weight of the tobacco material. Amongst the several types of tobacco utilized for the manufacture of cigarettes, burley varieties are generally found to have the highest nitrate content. Stem materials, which may be incorporated in various physical forms into the total combustible mixture or "filler" held by the paper wrapper, often contain higher nitrate contents than the corresponding leaf or lamina portions.

During the combustion process, the nitrate content of the tobacco produces nitric oxide as a component of the gaseous phase of the smoke stream. If the smoke is collected and held a period of time for analytical purposes, the initially formed NO produces $NO_2$, $N_2O_3$ and $N_2O_4$, generally referred to as "nitrogen oxides".

It has long been sought to minimize the nitrogen oxide content of cigarette smoke. Removal of the precursor potassium nitrate has been achieved by various techniques applied by way of water-based treatment of tobacco, for example, aqueous extracts of tobacco may be subjected to concentration and/or cooling treatments which cause formation of potassium nitrate crystals separable from the remaining extract liquor by filtration. Aqueous tobacco extracts have also been subjected to ion-exchange and microbial treatments for the removal of dissolved nitrate ions.

The extraction of selected water soluble components from tobacco is relatively expensive, and may cause considerable alteration of smoking quality. Such extractions are in fact generally conducted in operations wherein stem materials and recovered fines are pulped and converted to a sheet structure which is subsequently blended into tobacco leaf filler material.

The reaction of hydrochloric acid with the inorganic nitrate ion as in potassium nitrate is well known, and may be expressed by the following equation.

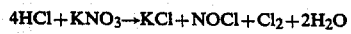

$$4HCl + KNO_3 \rightarrow KCl + NOCl + Cl_2 + 2H_2O$$

When tobacco or silage crop is treated with hydrochloric acid, the above-noted reaction causes removal of nitrate ion with attendant formation of the volatile species NOCl, $Cl_2$ and $H_2O$. However, the NOCl and $Cl_2$ are so highly reactive that they interact with tobacco or silage crop constituents to form undesirable nonvolatile chlorinated organic species.

It is accordingly an object of the present invention to provide a relatively inexpensive process for the removal of inorganic nitrate from leafy agricultural materials.

It is another object of this invention to provide a process as in the foregoing object which does not involve a water-extraction of the agricultural material.

It is a further object of the present invention to provide a process of the aforesaid nature which utilizes HCl without producing significant amounts of chlorinated organic compounds within the treated material.

These objects and other objects and advantages of the invention will be apparent from the following description.

SUMMARY OF THE INVENTION

The above and other beneficial objects and advantages are accomplished in accordance with the present invention by a process comprising:

(a) conveying agricultural material having a moisture content between about 3% and 12% to a reaction zone, (b) contacting said material with HCl gas in said reaction zone for at least 3 seconds in a manner whereby reaction gases are produced, (c) limiting the duration of contact of said reaction gases with said material to less than three minutes, and (d) sweeping the HCl-contacted material with a carrier gas.

In preferred embodiments of the invention, the HCl gas is a component of a gas mixture comprising carrier gasses such as nitrogen, carbon dioxide and helium. The carrier gases are inert with respect to enhancement of the formation of chlorinated organic compounds within the treated material. Certain reactive gases such as sulfur dioxide and ethylene may be incorporated within the carrier gas to interact with $Cl_2$ or NOCl to form volatile or harmless species. The gas mixture may be applied in a manner to fluidize the agricultural material in the reaction zone. The inert component of the gas mixture may further serve as the carrier gas. The amount of HCl gas utilized in contact the material is preferably between about 70% and 120% of the theoretically required amount based upon the above equation and the nitrate content of the agricultural material. In particularly preferred embodiments, the duration of contact of the HCl gas with the tobacco material is between about 3 and 30 seconds.

The function of the carrier gas is to remove HCl and gaseous reaction products from the treated material. In particularly preferred embodiments, the agricultural material is in a comminuted form as may be produced by cutting, shredding or pulverizing, and disposed in shallow layers or otherwise disposed such that the carrier gas may efficiently remove the reaction gases.

DESCRIPTION OF THE PREFERRED EMBODIMENTS

For the purpose of determining the effectiveness of the treatment method of the present invention, ten gram sample portions of the agricultural plant material were selected for analytical determinations. In determining nitrate content, the sample portion was extracted with water in a soxhlet extractor for 12 hours. The quality of nitrate ion in the water extract was then determined by an Orion ion-selective electrode with compensation for interfering species. The content of chlorinated organic compounds was determined in one manner by comparing the total elemental chlorine content of the agricultural material before and after treatment by the method of this invention. In other methods of testing for chlorocarbons, the samples were pyrolyzed or smoked and the volatile species were analyzed by infrared or mass spectrometer techniques.

Where the agricultural material is tobacco, the tobacco is preferably in its cured form. Tobacco having been treated by the process of this invention was used to fabricate cigarettes of 65 mm rod length having acceptable firmness and containing 1.0 gram of tobacco. The cigarettes were equipped with a 20 mm cellulose acetate tow filter plug, and provided an overall resistance-to-draw (RTD) of 5.5 inches water.

A puff-by-puff procedure was used to determine the percent NO removal from mainstream smoke passing through the cigarette filter. Five cigarettes were utilized for each determination. These cigarettes were smoked simultaneously on a five-port smoking machine using standard specifications, namely a 35 ml puff of 2 second duration taken every 60 seconds. The environmental smoking conditions of temperature and relative humidity (R.H.) were maintained at 75 degrees F.±1 degree and 60% R.H.±2%. Each port was equipped with a standard Cambridge filter pad of 0.3 micron pore size to removal total particulate matter (TPM) from the smoke stream. The gas phase smoke emergent from the five ports, 175 ml in total volume, was mixed in a manifold system. One aliquot of smoke was drawn under vacuum through an Oxides of Nitrogen Analyzer, model 1600, made by Columbia Scientific Industries of Austin, Texas, which monitored the chemiluminescence reaction produced by the reaction of NO with ozone ($O_3$). The NO delivery was quantitated by comparison to an NO peak response of known concentration produced from a calibrated $NO/N_2$ gas mixture supplied by the Linde Company of New Jersey. The % reduction in NO delivery was computed according to the formula: 100 (NO control-NO sample)/NO control=% reduction in NO in the smoke. Two determinations were made for each tested sample. Alternatively, the collected smkoke may be analyzed by infra red spectrographic methods which generally indicate a total nitrogen oxide value expressed as "$NO_x$". Currently commercial cigarettes have $NO_x$ values between about 0.10 and 0.40 mg/cigt.

The moisture content of the tobacco, sometimes referred to as the oven volatiles (OV), is determined by weighing a tobacco sample before and after exposure for 3 hours in a circulating air oven at 100 degrees C.

The reaction zone may generally be a confining vessel having ports for inlet and egress of tobacco or silage material, and ports for inlet and egress of gases. The confining vessel is preferably operated on a continuous basis, whereby constant uniform quantities of tobacco and HCl reaction gas are entered into the vessel. In order to resist the corrosive effects of the HCl, $Cl_2$, and NOCl gaseous species involved in the process, equipment having plastic or glass contact surfaces is utilized.

The present invention is based in part upon the discovery that gaseous HCl will interact quickly with nitrate ion, whereas the rate of reaction of NOCl, $Cl_2$ and HCl with tobacco is slower, and can be avoided by the careful control of factors relevant to the formation of covalent organic bonds.

In the treatment of stem materials, it has been found that the stems should preferably be in a shredded or rolled and cut form suitable for blending into cut leaf tobacco. The rolled stems are prepared by a crushing of moisturized whole stems, followed by cutting at 75 to 200 cuts per inch, and drying. Such comminuted forms of stem material present less retention of reaction gases because of enhanced diffusion characteristics. In general, the comminuted form of plant materials treated by the process of this invention will pass through a Number 2.5 U.S. Bureau of Standards sieve, and preferably will pass through an even smaller Number 4 sieve.

The following examples present illustrative but non-limiting embodiments of the present invention.

Example 1

Rolled and cut burley stems (120 cuts/inch) having a moisture content of 7.5% and a $KNO_3$ content of 8.2% were entered into the inlet extremity of a conveying device comprising an auger housed within a cylindrical jacket of 8 inch diameter and 4 foot length. The pitch of the continuous auger helix is such as to have 12 revolutions within the length of the jacket. The auger makes a substantially gas-tight fit with the interior wall of the jacket. The exterior of the jacket is provided with heating and cooling means which maintain the tobacco at desired temperatures ranging from 65 degrees F. to 160 degrees F.

The rate of delivery of the stem material to the conveying auger is 15 lbs/hr. At the location of the sixth revolution of the auger, a reaction gas mixture comprising 60% HCl and 40% $N_2$ (by weight) is caused to flow through aperture ports in the jacket and into contact with the tobacco. The rate of flow of the gas mixture is 3.55 pounds/hr., which provides an amount of HCl equal to about 120% of the stoichiometric requirement based upon the flow rate of the tobacco, its nitrate content, and the aforementioned equation.

A ring of gas exhaust apertures is positioned in the jacket at the site of the ninth revolution of the auger. The apertures communicate with an external vacuum manifold. Sufficient exhaust vacuum is applied to the manifold as to remove a volume of gas at least equal to the volumetric flow of the reaction gas mixture. The space within the conveying device between the ports which admit the reaction gas, and the ring of exhaust apertures constitutes a reaction zone. The exhausted gas is led through a NaOH scrubber solution for safe disposal. A ring of apertures is positioned in the jacket at the site of the tenth revolution of the auger. The apertures communicate with a manifold which supplies air carrier gas to sweep the treated tobacco.

The rotational speed of the auger is adjustable so as to cause the residence time of the tobacco within the entire length of the conveyor device to be between 12 seconds and 10 minutes. The attendant residence time of the tobacco between the reaction gas inlet and the exhaust apertures is between 3 seconds and 2.5 minutes.

With the temperature of the tobacco maintained at about 75 degrees F., various treatment durations were studied. The treated tobacco was tested for nitrate content and was blended at the 50% level with burley bright and oriental cut leaf for the production of cigarettes. The following data was obtained:

| Residence Time In Reaction Zone | Nitrate Removed % | Reduction of NO in Smoke % | Chlorocarbons in Smoke mg/cigt. |
| --- | --- | --- | --- |
| 3 seconds | 43 | 18 | N.D.* |
| 10 seconds | 54 | 26 | N.D. |
| 45 seconds | 67 | 35 | N.D. |
| 1 minute | 78 | 41 | .02 |
| 1 minute, 30 seconds | 88 | 43 | .05 |
| 2 minutes | 97 | 45 | .07 |

| Residence Time In Reaction Zone | Nitrate Removed % | Reduction of NO in Smoke % | Chlorocarbons in Smoke mg/cigt. |
|---|---|---|---|
| 2 minutes, 30 seconds | 99 | 48 | .11 |

N.D. = none detected

As the date indicate, treatment of the tobacco by the general method of this invention reduces the nitrate content of the tobacco and reduces the NO content of the smoke generated by the treated tobacco. However, when the duration of time in the reaction zone increases beyond 2 minutes, there is a pronounced and undesirable increase in the content of chlorocarbons in the cigarette smoke.

Example 2

The conditions of Example 1 are repeated with the exception that the reaction gas mixture is comprised of 40% HCl and 60% $CO_2$ (by weight), and the flow rate of the reaction gas mixture is increased by about 30% to maintain the same stoichiometric relationship between the HCl and the tobacco. The rate of exhaust is also increased so as to maintain the same ratio of reaction gas volume to exhaust volume. The following data was obtained:

| Residence Time In Reaction Zone | Nitrate Removed % | Reduction of NO in Smoke % | Chlorocarbons in Smoke mg/cigt. |
|---|---|---|---|
| 3 seconds | 46 | 22 | N.D. |
| 10 seconds | 55 | 25 | N.D. |
| 45 seconds | 69 | 36 | N.D. |
| 1 minute | 81 | 43 | N.D. |
| 1 minute, 30 seconds | 93 | 48 | .01 |
| 2 minutes | 100 | 49 | .04 |
| 2 minutes, 30 seconds | 100 | 52 | .05 |

The data suggests that the additional inert gas in the more dilute reaction gas mixture provides a better sweeping effect to remove gaseous byproducts, thereby producing less chlorocarbons in the smoke.

Example 3

Ten gram samples of shredded cured burley stem lamina tobacco having 5.6% moisture were treated in a series of tests wherein the tobacco sample was confined within a vertically oriented glass cylinder having a height of two feet, diameter of 2½ inches, and a coarse grade sintered glass porous bottom plate. The lower surface of the porous bottom plate communicates with a gas-handling system having Y valve capable of selectively directing either a 10% HCl/90% $N_2$ mixture, or pure nitrogen carrier gas to the glass cylinder.

When treated with either gas, the flow rate was adjusted to cause fluidization of the shreds of tobacco. In a series of tests, the duration of treatment with the HCl mixture was varied, followed immediately by a 5 minute duration flow of the carrier gas. The following results were obtained:

| Duration of HCl treatment | % $NO_3$ Reduction | Chlorocarbon Content (ppm) |
|---|---|---|
| 3 seconds | 66 | N.D. |
| 12 seconds | 87 | N.D. |
| 25 seconds | 91 | 2 |
| 50 seconds | 99 | 5 |
| 120 seconds | 99 | 7 |

The indicated controlled durations of HCl gas treatments approximate the durations at which the reaction gases may be expected to be in contact with the tobacco. For example, in no instance will the duration of contact of the reaction gases exceed the duration of treatment with the HCl gas. In some instances, particularly where complete removal of the nitrate occurs, no further reaction gases such as NOCl may be generated after a certain duration of HCl gas treatment. In such instances, the HCl gas serves as a carrier gas to sweep reaction gases from the tobacco.

Example 4

Whole ears of corn having a moisture content of 10% and nitrate content of 3.1% were shredded to a feed sized particulate mixture for silo storage. To demonstrate an improper treatment, representative of results achievable by prior art knowledge, the shredded mixture was placed in a vertical cylinder of 4 foot height and 6" diameter, and was treated with pure HCl gas entering the bottom of the cylinder and exiting the top of the cylinder. There was no interparticle movement as in the case of fluidization, auger agitation or tumbling in a rotating drum.

The total contact time of the gaseous reaction products with the silage was dependent upon the location of the silage within the cylinder. The uppermost portions of silage received about 5 minutes of contact with the gaseous reaction products containing $Cl_2$ and NOCl. The reddish-colored NOCl gas was observed emerging from the top of the cylinder. Analysis of the material within the cylinder revealed no trace of nitrate ion throughout the cylinder. However, material in the upper regions of the cylinder was found to contain 27 ppm of chlorocarbons.

By way of comparison, the same shredded corn product was instead treated by the process of this invention in a rotating drum using 5% HCl in $N_2$ for a contact time of 25 seconds, followed by sweeping with air as a carrier gas for 5 minutes. By virtue of such treatment, all nitrate was removed, and no trace of chlorocarbons was produced.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. A process for treating nitrate-containing agricultural plant material to remove nitrate thereform comprising:
   (a) conveying said agricultural material having a moisture content between about 3% and 12% to a reaction zone,
   (b) contacting said material with HCl gas in said reaction zone for at least 3 seconds in a manner whereby reaction gases are produced by the interaction of the HCl gas with the nitrate.

(c) limiting the duration of contact of said reaction gases with said material to less than three minutes, and (d) sweeping the HCl-contacted material with a carrier gas.

2. The process of claim 1 wherein said agricultural material is corn.

3. The process of claim 1 wherein said agricultural material is cured tobacco.

4. The process of claim 3 wherein said cured tobacco is the stem component of the tobacco.

5. The process of claim 1 wherein said HCl gas is utilized as a mixture with another gas which is inert to the agricultural material being treated.

6. The process of claim 1 wherein the material is in a comminuted form.

7. The process of claim 6 wherein said material undergoes interparticle movement within the reaction zone.

8. The process of claim 5 wherein the amount of HCl gas within said mixture is between about 5% and 60%.

9. The process of claim 1 wherein the duration of contact of said material with said HCl gas is between about 3 and 30 seconds.

10. The process of claim 1 wherein said carrier gas is selected from the group consisting of nitrogen, carbon dioxide, air and helium.

11. The process of claim 1 wherein said material is continuously advanced through said reaction zone.

12. The process of claim 1 wherein said reaction gases contain NOCl.

13. The process of claim 1 wherein the amount of HCl utilized to contact the agricultural material is between 70% and 120% of the stoichiometric amount based upon the nitrate content of the material within the reaction zone.

* * * * *